(12) United States Patent
Gao

(10) Patent No.: US 11,627,594 B2
(45) Date of Patent: Apr. 11, 2023

(54) UPLINK CONTROL INFORMATION TRANSMISSION METHOD AND APPARATUS

(71) Applicant: China Academy of Telecommunications Technology, Beijing (CN)

(72) Inventor: Xuejuan Gao, Beijing (CN)

(73) Assignee: DATANG MOBILE COMMUNICATIONS EQUIPMENT CO., LTD., Beijing (CN)

(*) Notice: Subject to any disclaimer, the term of this patent is extended or adjusted under 35 U.S.C. 154(b) by 98 days.

(21) Appl. No.: 16/958,748

(22) PCT Filed: Nov. 2, 2018

(86) PCT No.: PCT/CN2018/113827
§ 371 (c)(1),
(2) Date: Jun. 29, 2020

(87) PCT Pub. No.: WO2019/128466
PCT Pub. Date: Jul. 4, 2019

(65) Prior Publication Data
US 2020/0344789 A1 Oct. 29, 2020

(30) Foreign Application Priority Data
Dec. 29, 2017 (CN) .......................... 201711480280.0

(51) Int. Cl.
*H04W 72/12* (2009.01)
*H04W 72/04* (2009.01)

(52) U.S. Cl.
CPC ... *H04W 72/1284* (2013.01); *H04W 72/0413* (2013.01)

(58) Field of Classification Search
None
See application file for complete search history.

(56) References Cited

U.S. PATENT DOCUMENTS

2016/0094996 A1\* 3/2016 Xiong ............... H04W 72/0446
370/329
2020/0170005 A1\* 5/2020 Matsumura ........... H04L 1/1861

FOREIGN PATENT DOCUMENTS

CN 101919196 A 12/2010
CN 102835086 A 12/2012
(Continued)

OTHER PUBLICATIONS

Kundu, et al. "Physical Uplink Control Channel Design for 5G New Radio" IEEE 5G World Forum Jul. 9-11, 2018 (Year: 2018).\*
(Continued)

*Primary Examiner* — Basil Ma
(74) *Attorney, Agent, or Firm* — Kilpatrick Townsend & Stockton, LLP

(57) ABSTRACT

Disclosed are an uplink control information transmission method and apparatus for guaranteeing that a network side can obtain various types of pieces of uplink control information in a timely manner. The method comprises: determining that the following condition is satisfied: there is an overlap between a transmission time-domain resource of scheduling request (SR) information and a transmission time-domain resource of a first UCI; and depending on whether the SR information is negative SR information or positive SR information, determining the transmission resource for transmitting the first UCI, and transmitting the first UCI on the determined transmission resource, and the determined transmission resource when the SR information is negative SR information is different from the determined transmission resource when the SR information is positive SR information.

14 Claims, 5 Drawing Sheets

HARQ-ACK: Hybrid Automatic Repeat reQuest feedback information
SR: Scheduling Request

(56) References Cited

FOREIGN PATENT DOCUMENTS

| CN | 106067845 A | 11/2016 |
|---|---|---|
| CN | 106712894 A | 5/2017 |
| EP | 2547058 A2 | 1/2013 |
| EP | 3035760 A1 | 6/2016 |
| WO | 2011019795 A1 | 2/2011 |
| WO | 2015103722 A1 | 7/2015 |
| WO | 2016048522 A1 | 3/2016 |

OTHER PUBLICATIONS

R1-1721002 Ericsson "On the Design of Long PUCCH for up to 2 bits" 3GPP WG1 #91 Reno Nov. 27-Dec. 1, 2017 (Year: 2017).*
R1-1718207 NTT "Short-PUCCH for UCI of up to 2 bits" 3GPP WG1 #90bis Prague Oct. 9-13, 2017 (Year: 2017).*
R1-17200089 Intel "Long PUCCH for more than 2 UCI bits" 3GPP WG1 #91 Reno Nov. 27-Dec. 1, 2017 (Year: 2017).*
R1-1720194 CATT "On short PUCCH format for up to two UCI bits" 3GPP WG1 #91 Reno Nov. 27-Dec. 1, 2017. (Year: 2017).*
R1-1721614 Ericsson "Summary of Contributions on PUCCH Structure for Short Duration" 3GPP WG1 #91 Remo Nov. 27-Dec. 1, 2017 (Year: 2017).*
Ericsson,"On the Design of Long PUCCH for up to 2 bits", 3GPP TSG RAN WG1 Meeting#91, Reno, USA, Nov. 27-Dec. 1, 2017, total 13 pages, R1-1721002.
NTT Docomo, Inc.,"Resource allocation for PUCCH", 3GPP TSG RAN WG1 Meeting 90bis,Prague, CZ, Oct. 9-13, 2017,total 13 pages,R1-1718214.
OPPO,"Short-PUCCH for UCI of up to 2 bits", 3GPP TSG RAN WG1 Meeting #91, Reno, USA, Nov. 27-Dec. 1, 2017, total 5 pages, R1-1719991.
Ericsson,"Summary of Contributions on PUCCH Structure for Short Duration", 3GPP TSG RAN WG1 Meeting#91, Reno, Nevada, Nov. 27-Dec. 1, 2017, total 16 pages, R1-1721614.
NTT Docomo, Inc."Short-PUCCH for UCI of up to 2 bits", 3GPP TSG RAN WG1 Meeting NR Ad-Hoc#3, Nagoya, Japan, Sep. 18-21, 2017, total 21 pages, R1-1716098.
Intel Corporation,"Remaining aspects of PUCCH for MTC", 3GPP TSG RAN WG1 Meeting #83,Anaheim, USA, Nov. 16-20, 2015, total 6 pages,R1-156502.
Samsung, "Remaining Issues for Short PUCCH with UCI of 1 or 2 Bits", 3GPP TSG RAN WG1 Meeting 91, Reno, USA, Nov. 27-Dec. 1, 2017, total 6 pages, R1-1720326.
Nokia et al., "On the short PUCCH design for small UCI payloads", 3GPP TSG RAN WG1 NR Ad-Hoc #2,Qingdao, P. R. China, Jun. 27-30, 2017, total 6 pages, R1-1710893.
NTT Docomo, Inc.,"New Radio (NR) Access Technology", 3GPP TSG RAN meeting #78, Lisbon, Portugal, Dec. 18-21, 2017, total 140 pages, RP-172461.
Ericsson,"Summary of Contributions on PUCCH Structure for Short Duration", 3GPP TSG RAN WG1 Meeting#91, Reno, Nevada, Nov. 27-Dec. 1, 2017, total 14 pages, R1 -1721395.
Samsung, "Short PUCCH for UCI of 1 or 2 Bits", 3GPP TSG RAN WG1 Meeting 90bis, Prague, CZ Oct. 9-13, 2017, total 7 pages, R1 -1717648.

* cited by examiner

HARQ-ACK: Hybrid Automatic Repeat reQuest feedback information
SR: Scheduling Request HARQ-ACK: Hybrid Automatic Repeat reQuest feedback information
SR: Scheduling Request
CS: Cyclic Shift HARQ-ACK: Hybrid Automatic Repeat reQuest feedback information
SR: Scheduling Request
CS: Cyclic Shift HARQ-ACK: Hybrid Automatic Repeat reQuest feedback information
SR: Scheduling Request HARQ-ACK: Hybrid Automatic Repeat reQuest feedback information
SR: Scheduling Request
CS: Cyclic Shift HARQ-ACK: Hybrid Automatic Repeat reQuest feedback information
SR: Scheduling Request
CS: Cyclic Shift HARQ-ACK: Hybrid Automatic Repeat reQuest feedback information
SR: Scheduling Request
CS: Cyclic Shift HARQ-ACK: Hybrid Automatic Repeat reQuest feedback information
SR: Scheduling Request HARQ-ACK: Hybrid Automatic Repeat reQuest feedback information
SR: Scheduling Request
CS: Cyclic Shift HARQ-ACK: Hybrid Automatic Repeat reQuest feedback information
SR: Scheduling Request
CS: Cyclic Shift

UPLINK CONTROL INFORMATION TRANSMISSION METHOD AND APPARATUS

The present application is a US National Stage of International Application No. PCT/CN2018/113827, filed on Nov. 2, 2018, which claims the priority from Chinese Patent Application No. 201711480280.0, filed with the China National Intellectual Property Administration on Dec. 29, 2017 and entitled "Uplink Control Information Transmission Method and Apparatus", which is hereby incorporated by reference in its entirety.

FIELD

The present application relates to the field of communication technologies, and particularly to a method and apparatus for transmitting uplink control information.

BACKGROUND

With the development of the mobile communication service demand, the International Telecommunication Union (ITU), the 3rd Generation Partnership Project (3GPP) and other organizations all begin to focus on the new wireless communication system, e.g., 5 Generation New RAT (5G NR) (RAT: Radio Access Technology).

In the current 5G NR, the Uplink Control Information (UCI) includes: Hybrid Automatic Repeat reQuest (HARQ) feedback information (i.e., HARQ-ACK information), Scheduling Request (SR) information, periodic Channel State Information (CSI), etc.

SUMMARY

The embodiments of the present application provide a method and apparatus for transmitting uplink control information, so as to ensure that the network side can obtain various types of UCI in time, e.g., the SR information and HARQ-ACK feedback information and/or periodic CSI.

A method for transmitting UCI according to an embodiment of the present application includes:

determining that a following condition is satisfied: the transmission time domain resource of Scheduling Request (SR) information overlaps with the transmission time domain resource of first UCI;

determining a transmission resource for transmitting the first UCI according to whether the SR information is negative SR information or positive SR information, and transmitting the first UCI on the determined transmission resource; where the transmission resource determined when the SR information is negative SR information is different from the transmission resource determined when the SR information is positive SR information.

The embodiment of the present application ensures that the network side can obtain various types of UCI (e.g., the SR information and HARQ-ACK feedback information and/or periodic CSI) in time through the above-mentioned method. Specifically, for example, when the HARQ-ACK information and the SR information are configured with different NR PUCCH formats or configured with the same format but unaligned transmission moments, and when the transmission time domain resources of the periodic CSI and the SR information overlap, the SR information and HARQ-ACK information and/or periodic CSI can be transmitted simultaneously, thereby ensuring that the network side can obtain the SR information and HARQ-ACK feedback information and/or periodic CSI in time.

Optionally, the condition further includes: the first UCI is configured to be transmitted using a first channel format, and the SR information is configured to be transmitted using a second channel format, or the SR information is configured to be transmitted in the first channel format and the transmission time of the SR information partially overlap with the transmission time of the first UCI.

Optionally, determining the transmission resource for transmitting the first UCI according to whether the SR information is negative SR information or positive SR information, and transmitting the first UCI on the determined transmission resource, specifically includes:

when the SR information is negative SR information, transmitting the first UCI using the first channel format on the transmission resource of the first UCI according to a first cyclic shift set;

when the SR information is positive SR information, transmitting the first UCI using the first channel format on the transmission resource of the first UCI according to a second cyclic shift set;

where the first cyclic shift set is different from the second cyclic shift set.

Optionally, the first cyclic shift set and the second cyclic shift set each is obtained according to the initial cyclic shift configured for the first UCI and a predetermined offset.

Optionally, the condition further includes: the first UCI is configured to be transmitted using a third channel format.

Optionally, determining the transmission resource for transmitting the first UCI according to whether the SR information is negative SR information or positive SR information, and transmitting the first UCI on the determined transmission resource, specifically includes:

when the SR information is negative SR information, transmitting the first UCI using the third channel format on a first transmission resource;

when the SR information is positive SR information, transmitting the first UCI using the third channel format on a second transmission resource;

where the first transmission resource is different from the second transmission resource.

Optionally, the condition further includes: the starting transmission times of the first UCI and the SR information are same; and/or the starting transmission time of the first UCI falls behind the starting transmission time of the SR information.

Optionally, the method further includes: if the starting transmission time of the first UCI is ahead of the starting transmission time of the SR information, then:

discarding the SR information; or, determining a UCI transmission scheme according to whether the SR information is positive SR information or not could be determined before the starting transmission time of the first UCI.

Optionally, determining a UCI transmission scheme according to whether the SR information is positive SR information or not could be determined before the starting transmission time of the first UCI, specifically includes:

in response to that the SR information is positive SR information or not is able to be determined before the starting transmission time of the first UCI, performing a step after determining that the condition is satisfied;

in response to that the SR information is positive SR information or not is not able to be determined before the starting transmission time of the first UCI, discarding the SR information.

Optionally, when the SR information is positive SR information, transmitting the first UCI in the first channel format on the transmission resource of the first UCI according to a second cyclic shift set, specifically includes:

when the SR information is positive SR information, performing a step after determining that the condition is satisfied on symbols overlapping with the transmission time domain resource of the SR information, within the transmission time domain resource of the first UCI.

Optionally, the method further includes:

transmitting the first UCI in the first channel format according to the first cyclic shift set on symbols not overlapping with the transmission time domain resource of the SR information, within the transmission time domain resource of the first UCI.

Optionally, the method further includes: on symbols not overlapping with the first UCI among symbols of the transmission time domain resource of the SR information, or on symbols not overlapping with the transmission time domain resource of the first UCI within the transmission time domain resource of the SR information when the starting transmission time of the first UCI falls behind the starting transmission time of the SR information, performing the following steps:

when the SR information is positive SR information, transmitting the positive SR information on transmission resource corresponding to the SR information using a PUCCH format configured for the SR information;

or, determining not to transmit the SR information;

or, if it is determined that the first UCI exists in the transmission time domain resource of the SR information before the starting transmission time of the SR information, determining not to transmit the SR information; otherwise, if the SR information is positive SR information, transmitting the positive SR information on transmission resource corresponding to the SR information using a PUCCH format configured for the SR information.

Optionally, the first channel format is the New Radio (NR) Physical Uplink Control Channel (PUCCH) format 0; and/or the second channel format is the New Radio (NR) Physical Uplink Control Channel (PUCCH) format 1.

Optionally, the third channel format is the New Radio (NR) Physical Uplink Control Channel (PUCCH) format 1 or 2 or 3 or 4.

Optionally, the first UCI is Hybrid Automatic Repeat reQuest feedback information (HARQ-ACK) and/or periodic Channel State Information (CSI).

An apparatus for transmitting UCI according to an embodiment of the present application includes:

a memory configured to store program instructions;

a processor configured to invoke the program instructions stored in the memory, and in accordance with the obtained program, perform the process of:

determining that a following condition is satisfied: the transmission time domain resource of Scheduling Request (SR) information overlaps with the transmission time domain resource of first UCI;

determining a transmission resource for transmitting the first UCI according to whether the SR information is negative SR information or positive SR information, and transmitting the first UCI on the determined transmission resource; where the transmission resource determined when the SR information is negative SR information is different from the transmission resource determined when the SR information is positive SR information.

Optionally, the condition further includes: the first UCI is configured to be transmitted using a first channel format, and the SR information is configured to be transmitted using a second channel format, or the SR information is configured to be transmitted using the first channel format and the transmission time of the SR information partially overlap with the transmission time of the first UCI.

Optionally, determining transmission resource for transmitting the first UCI according to whether the SR information is negative SR information or positive SR information, and transmitting the first UCI on the determined transmission resource, specifically includes:

when the SR information is negative SR information, transmitting the first UCI using the first channel format on the transmission resource of the first UCI according to a first cyclic shift set;

when the SR information is positive SR information, transmitting the first UCI using the first channel format on the transmission resource of the first UCI according to a second cyclic shift set;

where the first cyclic shift set is different from the second cyclic shift set.

Optionally, the first cyclic shift set and the second cyclic shift set each is obtained according to the initial cyclic shift configured for the first UCI and a predetermined offset.

Optionally, the condition further includes: the first UCI is configured to be transmitted using a third channel format.

Optionally, determining the transmission resource for transmitting the first UCI according to whether the SR information is negative SR information or positive SR information, and transmitting the first UCI on the determined transmission resource, specifically includes:

when the SR information is negative SR information, transmitting the first UCI using the third channel format on a first transmission resource;

when the SR information is positive SR information, transmitting the first UCI using the third channel format on a second transmission resource;

where the first transmission resource is different from the second transmission resource.

Optionally, the condition further includes: the starting transmission times of the first UCI and the SR information are same; and/or the starting transmission time of the first UCI falls behind the starting transmission time of the SR information.

Optionally, the processor is further configured to: if the starting transmission time of the first UCI is ahead of the starting transmission time of the SR information, then:

discard the SR information; or, determine a UCI transmission scheme according to whether the SR information is positive SR information or not could be determined before the starting transmission time of the first UCI.

Optionally, determining a UCI transmission scheme according to whether the SR information is positive SR information or not could be determined before the starting transmission time of the first UCI, specifically includes:

in response to that the SR information is positive SR information or not could be determined before the starting transmission time of the first UCI, performing a step after determining that the condition is satisfied;

in response to that the SR information is positive SR information or not could not be determined before the starting transmission time of the first UCI, discarding the SR information.

Optionally, when the SR information is positive SR information, transmitting the first UCI in the first channel format on the transmission resource of the first UCI according to a second cyclic shift set, specifically includes:

when the SR information is positive SR information, performing a step after determining that the condition is satisfied on symbols overlapping with the transmission time domain resources of the SR information within the transmission time domain resource of the first UCI.

Optionally, the processor is further configured to:

transmit the first UCI in the first channel format according to the first cyclic shift set on symbols not overlapping with the transmission time domain resource of the SR information within the transmission time domain resource of the first UCI.

Optionally, the processor is further configured to: on symbols not overlapping with the first UCI among symbols of the transmission time domain resource of the SR information, or on symbols not overlapping with the transmission time domain resource of the first UCI within the transmission time domain resource of the SR information when the starting transmission time of the first UCI falls behind the starting transmission time of the SR information, perform the following steps:

when the SR information is positive SR information, transmitting the positive SR information on transmission resource corresponding to the SR information using a PUCCH format configured for the SR information;

or, determining not to transmit the SR information;

or, if it is determined that the first UCI exists in the transmission time domain resources of the SR information before the starting transmission time of the SR information, determining not to transmit the SR information; otherwise, if the SR information is positive SR information, transmitting the positive SR information on transmission resources corresponding to the SR information in a PUCCH format configured for the SR information.

Optionally, the first channel format is the New Radio (NR) Physical Uplink Control Channel (PUCCH) format 0; and/or the second channel format is the New Radio (NR) Physical Uplink Control Channel (PUCCH) format 1.

Optionally, the third channel format is the New Radio (NR) Physical Uplink Control Channel (PUCCH) format 1 or 2 or 3 or 4.

Optionally, the first UCI is Hybrid Automatic Repeat reQuest feedback information (HARQ-ACK) and/or periodic Channel State Information (CSI).

Another apparatus for transmitting UCI according to an embodiment of the present application includes:

a first unit configured to determine that a following condition is satisfied: the transmission time domain resource of Scheduling Request (SR) information overlaps with the transmission time domain resource of first UCI;

a second unit configured to determine a transmission resource for transmitting the first UCI according to whether the SR information is negative SR information or positive SR information, and transmit the first UCI on the determined transmission resource; where the transmission resource determined when the SR information is negative SR information is different from the transmission resource determined when the SR information is positive SR information.

Another embodiment of the present application provides a computer storage medium storing the computer executable instructions which are configured to cause the computer to perform any one of the above-mentioned methods.

BRIEF DESCRIPTION OF THE DRAWINGS

Embodiments of the present application are illustrated by the accompanying figures which need to be used in describing the embodiments will be introduced below briefly. The accompanying figures described below are only some embodiments of the present application.

DETAILED DESCRIPTION OF THE EMBODIMENTS

Figure 1:
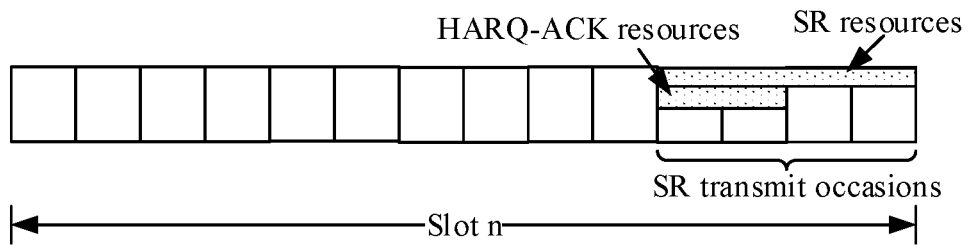
FIGS. 1-10 each is a schematic diagram illustrating the relationship between the transmission time domain resource of the SR information and the transmission time domain resource of the HARQ-ACK information provided by embodiments of the present application.

Embodiments of the disclosure will be described clearly below in combination with the accompanying drawings.

Embodiments of the disclosure can be applied to various communication systems, for example, Global System of Mobile communication (GSM) system, Code Division Multiple Access (CDMA) system, Wideband Code Division Multiple Access (WCDMA) system, General Packet Radio Service (GPRS), Long Term Evolution (LTE) system, Advanced long term evolution (LTE-A) system, Universal Mobile Telecommunication System (UMTS), New Radio (NR) and the like.

It should be further understood that the User Equipment (UE) includes but not limited to a Mobile Station (MS), a mobile terminal, a mobile telephone, a handset, a portable equipment or the like in the embodiments of the disclosure. This user equipment may communicate with one or more core networks via the Radio Access Network (RAN), for example, the user equipment may be a mobile telephone (or called "cellular" telephone), a computer with the wireless communication function, or the like. The user equipment may also be a portable, pocket, handheld, computer built-in or vehicle-carried mobile device.

In the embodiments of the disclosure, the base station (e.g., access point) may mean the device in the access network communicating with the wireless terminal via one or more sectors over the air interface. The base station may be used to perform the interconversion between the received air frame and the IP packet, and used as the router between the wireless terminal and the rest of the access network, where the rest of the access network may include Internet Protocol (IP) networks. The base station may further coordinate the attribute management of the air interface. For example, the base station may be the Base Transceiver Station (BTS) in the GSM or CDMA, or may be the NodeB in the TD-SCDMA or WCDMA, or may be the evolutional Node B (eNodeB or eNB or e-NodeB) in the LTE, or may be the gNB in the 5G NR, which is not limited in the disclosure.

The embodiments of the present application provide a method and apparatus for transmitting uplink control information, to ensure that the network side can obtain various types of UCI in time. For example, when the HARQ-ACK feedback information and the SR information are configured with different NR PUCCH formats or configured with the same format but unaligned transmission moments, or when the HARQ-ACK and/or periodic CSI is/are configured with a certain NR PUCCH format, the simultaneous transmission of the SR information and the HARQ-ACK feedback information and/or the periodic CSI may be achieved, to ensure that the network side can obtain various types of UCI in time.

In the 5G NR, the Hybrid Automatic Repeat reQuest (HARQ) ACKnowledgement (HARQ-ACK) information may be transmitted using the NR Physical Uplink Control Channel (PUCCH) format 0 or 1 or 2 or 3 or 4, the Scheduling Request (SR) information may be transmitted using the NR PUCCH format 0 or 1, and the periodic Channel State Information (CSI) may be transmitted using the NR PUCCH format 2 or 3 or 4. When the HARQ-ACK information and the SR information are configured with different NR PUCCH formats or configured with the same format but unaligned transmission moments, if there is overlap of transmission time domain resources between the HARQ-ACK information and the SR information, there is no solution on how to transmit the HARQ-ACK information and the SR information in the prior art. When there is overlap between the periodic CSI and the SR information, there is no solution on how to transmit the periodic CSI and the SR information in the prior art.

In the NR system, a total of 5 PUCCH formats are defined, i.e., NR PUCCH formats 0, 1, 2, 3, and 4. PUCCH format 0 or 1 may be used to carry 1 bit to 2 bits of Uplink Control Information (UCI) for transmission, and the PUCCH format 2, 3 or 4 may be used to carry more than 2 bits of UCI for transmission. The PUCCH format 0 or 2 are short PUCCH formats and assigned 1 symbol to 2 symbols for transmission, and the PUCCH format 1, 3 or 4 are long PUCCH formats and assigned 4 to 14 symbols for transmission. The PUCCH format 0 is based on sequence selection, and there is no pilot. The PUCCH format 1 is based on data modulation and spread spectrum, and there is a pilot, thus the channel estimation needs to be performed based on the pilot. Here the pilot symbols are at the even positions in the symbols occupied by the PUCCH format 1, and the UCI symbols are at the odd positions (assuming that the first symbol in the symbols occupied by PUCCH format 1 is numbered as 0 as the reference).

The SR information may be transmitted using the PUCCH format 0 or 1. When PUCCH format 0 is configured for SR information, if there is an SR (that is, positive SR information) in the SR information transmit occasion (that is, transmission time domain resource), a cyclic shift value pre-configured for the SR information according to the high-level signaling is used to cyclically shift the base sequence to obtain a transmission sequence for transmitting on the configured Resource Block (RB). If there is no SR (negative SR information), the SR information is not transmitted. When PUCCH format 1 is configured for SR information, if there is the positive SR information in the SR information transmit occasion (that is, transmission time domain resource), a modulation symbol representing the SR information is carried on the base sequence subjected to the cyclic shifting and time domain spread spectrum and is mapped to symbols of the PUCCH format 1 for transmitting UCI, and the pilot is mapped to the remaining symbols for transmission. If the SR information is the negative SR information, the SR information is not transmitted.

Any of these five formats may be used for the HARQ-ACK information. When PUCCH format 0 is configured for the HARQ-ACK information, different HARQ-ACK information feedback states are indicated by different cyclic shift values. For HARQ-ACK information of 1 bit, there are two feedback states: acknowledgement {ACK} and non-acknowledgement {NACK}. Two cyclic shift values are needed, and different cyclic shift values correspond to different HARQ-ACK information feedback states. As shown in Table 1 below, $C_{initial}$ is the pre-configured initial cyclic shift value, and the cyclic shift values corresponding to different HARQ-ACK information feedback states may be obtained by this value plus a predetermined offset. For the HARQ-ACK information of 2 bits, there are four feedback states {ACK, ACK}, {NACK, ACK}, {ACK, NACK}, {NACK, NACK}. Four cyclic shift values are needed, and different cyclic shift values correspond to different HARQ-ACK information feedback states, as shown in Table 2 below. When PUCCH format 1 is configured for the HARQ-ACK, the 1-bit HARQ-ACK information to be transmitted is modulated by the BPSK or the 2-bit HARQ-ACK information to be transmitted is modulated by the QPSK to obtain a modulation symbol. Then the modulation symbol is carried on the base sequence subjected to the cyclic shifting and time domain spread spectrum and is mapped to symbol of the PUCCH format 1 for transmitting the UCI. The pilot is mapped to the remaining symbols for transmission.

When PUCCH format 2 or 3 or 4 is configured for the HARQ-ACK and/or periodic CSI, the HARQ-ACK information and/or periodic CSI of more than 2 bits to be transmitted subjected to the channel encoding and rate matching, is/are mapped to other PUCCH resource than that for the pilot.

TABLE 1 mapping relationship of cyclic shift
for 1-bit HARQ-ACK information

| HARQ-ACK Information | NACK | ACK |
|---|---|---|
| Cyclic Shift | $C_{initial}$ | $(C_{initial} + 6)$ mod12 |

TABLE 2 mapping relationship of cyclic shift
for 2-bit HARQ-ACK information

| HARQ-ACK Information | NACK, NACK | NACK, ACK | ACK, ACK | ACK, NACK |
|---|---|---|---|---|
| Cyclic Shift | $C_{initial}$ | $(C_{initial} + 3)$ mod 12 | $(C_{initial} + 6)$ mod 12 | $(C_{initial} + 9)$ mod 12 |

In the NR system, different PUCCH formats have different transmission schemes. When the first UCI and the SR information are configured with different NR PUCCH formats or configured with the same format but unaligned transmission moments (that is, the transmission time domain resources of the SR information partially overlap with the transmission time domain resources of the first UCI), if the transmission time domain resources of the first UCI and the SR information overlap, an embodiment of the present application provides for transmitting the first UCI and the SR information. Here the first UCI, for example, may include HARQ-ACK and/or periodic CSI.

In an embodiment of the present application, a condition 1 is: when NR PUCCH format 0 is configured for the HARQ-ACK information, and NR PUCCH format 1 is configured for the SR information, or PUCCH format 0 is configured for SR information but the transmission time domain resources of SR information partially overlap with the transmission time domain resources of the HARQ-ACK information; if the HARQ-ACK information transmission exists in the transmit occasion of the SR information, that is, the transmission time domain resources of the HARQ-ACK information overlap with the transmission time domain resources of the SR information, where the overlap may be partial overlap or the transmission time domain resources of the HARQ-ACK information is contained in the transmission time domain resources of the SR information, then the HARQ-ACK information is transmitted as follows:

when the SR information is negative SR information, the HARQ-ACK information is transmitted on the transmission resource of the HARQ-ACK information, using PUCCH format 0 according to a first cyclic shift set;

when the SR information is positive SR information, the HARQ-ACK information is transmitted on the transmission resource of the HARQ-ACK information, using the PUCCH format 0 according to a second cyclic shift set.

Here, the first cyclic shift set is different from the second cyclic shift set, and each of them is obtained according to an initial cyclic shift configured for the HARQ-ACK information and a predetermined offset. By using different cyclic shift sets, the HARQ-ACK is transmitted on different transmission resource (that is, different code domain resource) for the positive SR and negative SR, thereby implicitly expressing the SR information. The base station performs blind detection on the PUCCH in different cyclic shift sets and may determine whether the positive SR exists based on the cyclic shift set where the PUCCH has been detected.

For example, when the negative SR information exists, for the 1-bit HARQ-ACK information and 2-bit HARQ-ACK information, the first cyclic shift set is obtained according to the Table 1 and Table 2, and the cyclic shift value corresponding to the current HARQ-ACK information feedback state is selected from the first cyclic shift set according to the Table 1 and Table 2, and PUCCH format 0 is used.

When the positive SR information exists, for the 1-bit HARQ-ACK information and 2-bit HARQ-ACK information, the second cyclic shift set is obtained according to the Table 3 and Table 4 below, and the cyclic shift value corresponding to the current HARQ-ACK information feedback state is selected from the second cyclic shift set according to the Table 3 and Table 4, and PUCCH format 0 is used.

TABLE 3 mapping relationship of cyclic shift for 1-bit HARQ-ACK information when positive SR information exists

| HARQ-ACK information | NACK | ACK |
|---|---|---|
| Cyclic shift | $(CS_{initial} + 3) \bmod 12$ | $(CS_{initial} + 9) \bmod 12$ |

TABLE 4 mapping relationship of cyclic shift for 2-bit HARQ-ACK information when positive SR information exists

| HARQ-ACK information | NACK, NACK | NACK, ACK | ACK, ACK | ACK, NACK |
|---|---|---|---|---|
| Cyclic shift | $(CS_{initial} + 1) \bmod 12$ | $(CS_{initial} + 4) \bmod 12$ | $(CS_{initial} + 7) \bmod 12$ | $(CS_{initial} + 10) \bmod 12$ |

In an embodiment of the present application, a condition 2 is: when NR PUCCH format 1 is configured for the HARQ-ACK information, regardless of whether the NR PUCCH format 0 or the NR PUCCH format 1 is configured for the SR information, if the HARQ-ACK information transmission exists in the transmit occasion of the SR information, that is, the transmission time domain resources of the HARQ-ACK information overlap with the transmission time domain resources of the SR information, where the overlap may be partial overlap or the transmission time domain resources of the HARQ-ACK information is contained in the transmission time domain resources of the SR information or the transmission time domain resources of the SR information is contained in the transmission time domain resources of the HARQ-ACK information, then the HARQ-ACK information is transmitted as follows:

when the SR information is negative SR information, the HARQ-ACK information is transmitted using the PUCCH format 1 on the first transmission resource of the HARQ-ACK information;

when the SR information is positive SR information, the HARQ-ACK information is transmitted using the PUCCH format 1 on the second transmission resource of the HARQ-ACK information.

Here, the first transmission resource is different from the second transmission resource. The difference is at least in frequency domain and/or code domain, e.g., different PRB positions, different OCC sequences, different cyclic shifts, etc. By using different transmission resources, the HARQ-ACK information is transmitted on different transmission resources for the positive SR and negative SR, thereby implicitly expressing the SR information. The base station performs blind detection on the PUCCH in different transmission resources and may determine whether the positive SR information exists through the transmission resource where the PUCCH has been detected. For example, the base station configures two different PUCCH format 1 resources (each PUCCH format 1 resource includes, for example, time-domain resources, frequency-domain RB positions, OCC sequences, cyclic shift values and other parameters) for the terminal, where at least one of the frequency-domain RB positions, OCC sequences (if used) and cyclic shift values in the two PUCCH format 1 resources are different. When the positive SR information exists, one of the PUCCH format 1 resources is selected to transmit the HARQ-ACK information; and when the negative SR exists, the other PUCCH format 1 resource is selected to transmit the HARQ-ACK information. For example, the first resource corresponds to the OCC1 and the second resource corresponds to the OCC2, that is, even if the RBs of the two resources are the same, the base station can determine whether the SR information is positive SR information by detecting the OCC sequence used by the PUCCH carrying the HARQ-ACK. The processes of distinguishing different resources in other ways are similar to this and will not be repeated here.

In an embodiment of the present application, the condition 3 is: when NR PUCCH format 2 or 3 or 4 is configured for the HARQ-ACK information and/or periodic CSI, regardless of whether NR PUCCH format 0 or the NR PUCCH format 1 is configured for the SR information, if the HARQ-ACK information and/or periodic CSI transmission exists in the transmit occasion of the SR information, that is, the transmission time domain resources of the HARQ-ACK information and/or periodic CSI overlap with the transmission time domain resources of the SR information, where the overlap may be partial overlap or inclusion relation, then the HARQ-ACK information and/or periodic CSI is/are transmitted as follows:

when the SR information is negative SR information, the HARQ-ACK information and/or periodic CSI is/are transmitted using the PUCCH format 2 or 3 or 4 on the first transmission resource of the HARQ-ACK information and/or periodic CSI;

when the SR information is positive SR information, the HARQ-ACK information and/or periodic CSI is/are transmitted using the PUCCH format 2 or 3 or 4 on the second transmission resource of the HARQ-ACK information and/or periodic CSI.

Here, the first transmission resource is different from the second transmission resource. The difference is at least in frequency domain and/or code domain (if there are code domain resources), e.g., different PRB positions, different OCC sequences, different cyclic shifts, etc. By using different transmission resources, the HARQ-ACK information and/or periodic CSI is/are transmitted on different transmission resources for the positive SR and negative SR, thereby implicitly expressing the SR information. The base station performs blind detection on the PUCCH in different transmission resources and may determine whether the positive SR exists through the transmission resource where the PUCCH has been detected. For example, the base station configures two different PUCCH format 2 resources (each PUCCH format 2 resource includes, for example, time-domain resources, frequency-domain RB positions and other parameters) for the terminal. Here at least the frequency-domain RB positions in the two PUCCH format 2 resources are different. When the positive SR information exists, one of the PUCCH format 2 resources is selected to transmit the HARQ-ACK; and when the negative SR exists, the other PUCCH format 2 resource is selected to transmit the HARQ-ACK. For example, the first resource includes RB1 and RB2, and the second resource includes RB3 and RB4. Then the base station may determine whether the positive SR exists by detecting the position of the RB where the PUCCH carrying the HARQ-ACK is located. The processes of distinguishing different resources in other ways are similar to this and will not be repeated here.

It should be noted that, under the conditions 1 to 3 described in the embodiments of the present application, the transmission time domain resources of the first UCI overlap with the transmission time domain resources of the SR information, including complete overlap and/or partial overlap. The complete overlap refers to that the start symbols for transmitting the first UCI and the SR information are the same; and the partial overlap refers to that the start symbols for transmitting the first UCI and the SR information are different. Another expression about the fact that the transmission time domain resources of the first UCI overlap with the transmission time domain resources of the SR information may be: the first UCI and the SR information need to be transmitted on the PUCCH in the transmit occasion of the SR. In an example, when the first UCI is the HARQ-ACK information, the HARQ-ACK information and the SR information need to be transmitted on the PUCCH. In another example, when the first UCI is the periodic CSI, the periodic CSI and the SR information need to be transmitted on the PUCCH, that is, the transmit occasion of the periodic CSI overlaps with the transmit occasion of the SR. In yet another example, when the first UCI is the HARQ-ACK information and periodic CSI, the HARQ-ACK information, periodic CSI and SR information need to be transmitted on the PUCCH.

It should be noted that the transmission time domain resource described in the conditions 1 to 3 according to the embodiments of the present application are specifically represented as the symbols occupied for transmission, e.g., SC-FDMA symbols or DFT-S-OFDM symbols or OFDM symbols or CP-OFDM, etc.

Here, for the above conditions 1 to 3, before performing the above operation, it is further possible to:

determine whether respective starting transmission times (i.e., start symbols, the same below) of the first UCI and SR information are aligned (that is, whether they are same), and in response to determining that they are aligned, perform the above operation;

and/or, determine whether the starting transmission time of the first UCI falls behind the starting transmission time of the SR information, and in response to determining that the starting transmission time of the first UCI falls behind the starting transmission time of the SR information, perform the above operation.

If the starting transmission time of the first UCI is ahead of the starting transmission time of the SR information, the SR information is dropped and only the first UCI is transmitted on the transmission time domain resource of the first UCI. Or when it can be determined whether the positive SR information exists before the starting transmission time of the first UCI, the above operation is performed according to the determined result about the SR information. When it cannot be determined whether the positive SR information exists before the starting transmission time of the first UCI, the SR information is dropped.

For the above behavior, when the positive SR information exists as negative SR information, there is no SR transmission on the transmission time domain resource of the SR information. Then the UE side considers that there is only the first UCI and there is no overlap of the transmission time domain resource with the SR information.

Alternatively, the above determining behavior may not be performed, and it is assumed that it can be determined whether the positive SR information exists before the starting transmission time of the first UCI regardless of the relative positions between the starting transmission time of the first UCI and the starting transmission time of the SR information. This is feasible because: when the starting transmission time of the first UCI falls behind or is aligned with the starting transmission time of the SR information, it can be sure to determine whether the positive SR information exists; and when the starting transmission time of the first UCI is ahead of the starting transmission time of the SR information, for the case 1, since the first UCI is ahead of the SR information by only one symbol, and whether the SR information is positive SR information in its transmit occasion needs to be determined before its transmit occasion, due to the duration for preparing the transmission channel of the SR information, it may be known whether the positive SR information exists at the position ahead of the transmit occasion of the SR information by one symbol; and for the cases 2 and 3, there is a need to determine the number of symbols ahead of the SR information according to the specific symbol length of the first UCI. When the number of ahead symbols is not many or the SR trigger is sent in advance in a previous slot, it may also be known whether the positive SR information exists at the beginning of the transmission of the first UCI. As such, the transmission scheme of the UCI such as SR information and HARQ-ACK information may be determined in accordance with the above-mentioned rule.

Alternatively, for the condition 1 described in the embodiment of the present application, the above operation may also be performed only for symbols overlapping with the symbols of the transmission time domain resource of the SR information among the symbols of the transmission time domain resource of the HARQ-ACK information. For symbols not overlapping with the symbols of the transmission time domain resource of the SR information among the symbols of the transmission time domain resource of the HARQ-ACK information, the transmission may be performed as if there is only the HARQ-ACK information, that is, the HARQ-ACK information is transmitted using the PUCCH format 0 according to the first cyclic shift set on the transmission resource of the HARQ-ACK information.

For the conditions 1 to 3 described in the embodiments of the present application, on symbols not overlapping with the symbols of the transmission time domain resource of the first UCI among the symbols of the transmission time domain resources corresponding to the SR information, or when the starting transmission time of the first UCI falls behind the starting transmission time of the SR information, on symbols not overlapping with the symbols of the transmission time domain resource of the first UCI among the symbols of the transmission time domain resource corresponding to the SR information, the following operations are performed:

if the positive SR information exists, the positive SR information is transmitted on the transmission resource corresponding to the SR information using the PUCCH format configured for the SR information;

or, the SR information transmission is not performed; it is assumed that: when the starting transmission time of the SR information is ahead of that of the first UCI, it can be determined whether there is an overlap between the symbols of the subsequent transmission time domain resource of the SR information and the symbols of the transmission time domain resources of the first UCI before the SR information transmission; because the determination on whether the HARQ-ACK information exists and the feedback state of the HARQ-ACK information is performed before the starting transmission time of the HARQ-ACK information, especially the determination on whether the HARQ-ACK information exists only depends on whether the corresponding downlink transmission is received, while a downlink transmission is usually performed before the transmit occasion of the SR information. The periodic CSI always needs to be transmitted at the configured periodic position, that is, as long as the transmission opportunities of the periodic CSI are known, it can be determined that there are periodic CSI transmissions in these transmission opportunities, where the transmission opportunities of the periodic CSI are pre-configured by high-level signaling. As such, it can be determined whether the first UCI exists before the starting transmission time of the SR information. Therefore, it can be implicitly indicated whether the positive SR information exists through the transmission resource on which the first UCI is transmitted, so that the SR information is implicitly transmitted without the transmission of the SR information on the transmission resource of the SR information;

or, when it can be determined that the first UCI exists in the transmit occasion of the SR information before the starting transmission time of the SR information, it is determined not to transmit the SR information; otherwise, if the SR information is positive SR information, the positive SR information is transmitted on the transmission resource corresponding to the SR information using the PUCCH format configured for the SR information;

or, whether the SR information is transmitted in the above cases is not be specified on the protocol and is determined by the terminal, so the base station does not determine the terminal's transmission method of the SR in the above non-overlapping symbols, and the terminal may arbitrarily select to transmit or drop the SR in the above manner.

Specific embodiments are given below for illustration.

EMBODIMENTS

It is assumed that the SR information is configured to be transmitted using the PUCCH format 1 with the length of 4 symbols, the initial cyclic shift value configured for the SR information is CS0-SR information, the Orthogonal Cover Code (OCC) sequence index is 0, which corresponds to the first OCC sequence in Table 5 below, and the RB is 1 RB, e.g., the RB with number 1. It is assumed that the last 4 symbols in slot n are determined as the transmit occasions of the SR information according to the periodic configuration of the SR information.

TABLE 5

| OCC sequence with length of 2 | |
|---|---|
| OCC Index | OCC |
| 0 | [1, 1] |
| 1 | [1, −1] |

It is assumed that: the HARQ-ACK information is configured to be transmitted using the PUCCH format 0 and 2 symbols are used for transmission; for 1-bit HARQ-ACK information transmission, the initial cyclic shift value configured for the HARQ-ACK information is CS0-AN (i.e., $CS_{initial}$ in Tables 1-4), and 1 RB (e.g., the RB with number 2) is occupied for transmission; then: when the transmit occasion of the SR information overlaps with the transmit occasion of the HARQ-ACK information, one of the following methods is performed.

Figure 2:
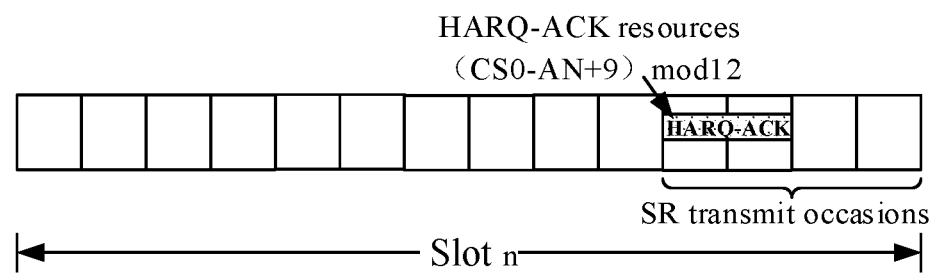
Figure 3:
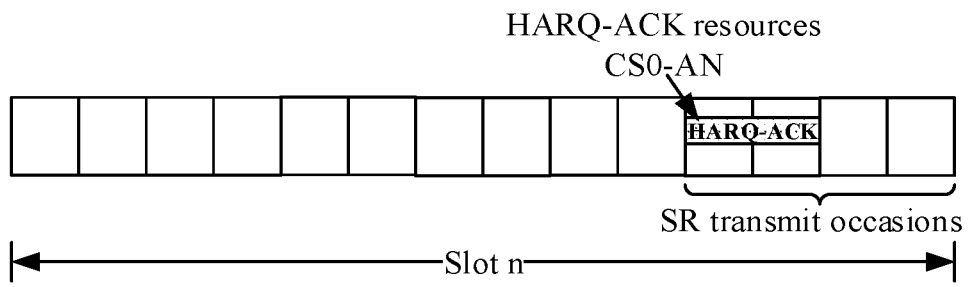

Method 1: processing according to the following different cases:

Case 1: as shown in FIG. 1, the transmission time domain resources (resources for short in the figure) configured for the HARQ-ACK information are the third and fourth symbols from last of the slot n, that is, the starting transmission time of the HARQ-ACK information is aligned with the starting transmission time of the SR information, that is, the start symbols are the same, then:

if the UE determines that there is a need to transmit SR in the current transmit occasion of the SR information, that is, the SR information is positive SR information (referred to as P-SR information for short), then the 1-bit HARQ-ACK information to be fed back is transmitted on the transmission resource of the HARQ-ACK information using the PUCCH format 0 according to the Table 3. That is, the Table 3 is looked up according to the feedback state for the 1-bit HARQ-ACK information to obtain the cyclic shift value corresponding to the actual transmission, e.g., the ACK information, and then the cyclic shift value for the actual transmission is determined as (CS0-AN+9) mod 12, which is used to cyclically shift the base sequence to obtain the sequence to be transmitted. The sequence to be transmitted is mapped onto the RB with number 2 corresponding to the HARQ-ACK information transmission and is transmitted on the third and fourth symbols from last in the slot n, as shown in FIG. 2;

if the UE determines that there is no need to transmit SR in the current transmit occasion of the SR information, i.e., the SR information is negative SR information (referred to as N-SR information for short), then the 1-bit HARQ-ACK information to be fed back is transmitted on the transmission resource of the HARQ-ACK information using the PUCCH format 0 according to the Table 1. That is, the Table 1 is looked up according to the feedback state for the 1-bit HARQ-ACK information to obtain the cyclic shift value corresponding to the actual transmission, e.g., the ACK, and then the cyclic shift value for the actual transmission is determined as CS0-AN, which is used to cyclically shift the base sequence to obtain the sequence to be transmitted, and the sequence to be transmitted is mapped onto the RB with number 2 corresponding to the HARQ-ACK information transmission and is transmitted on the third and fourth symbols from last in the slot n, as shown in FIG. 3.

Figure 4:
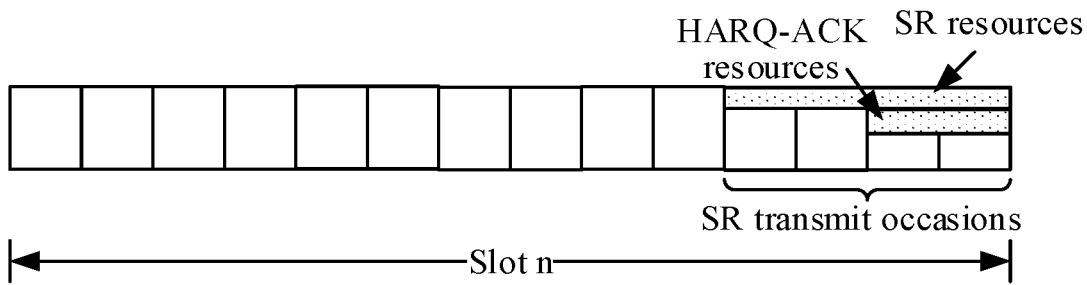
Figure 5:
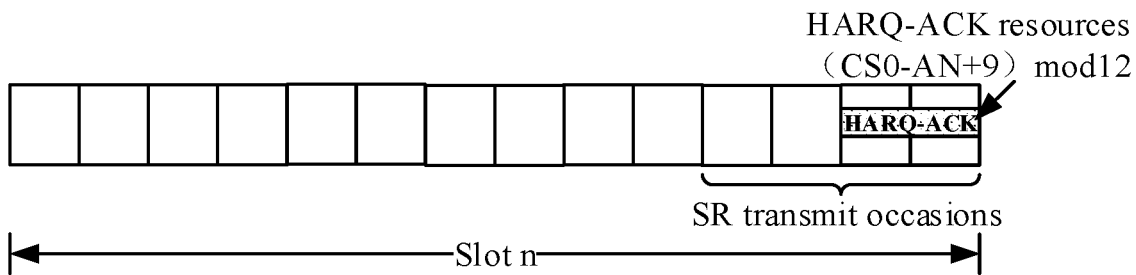
Figure 6:
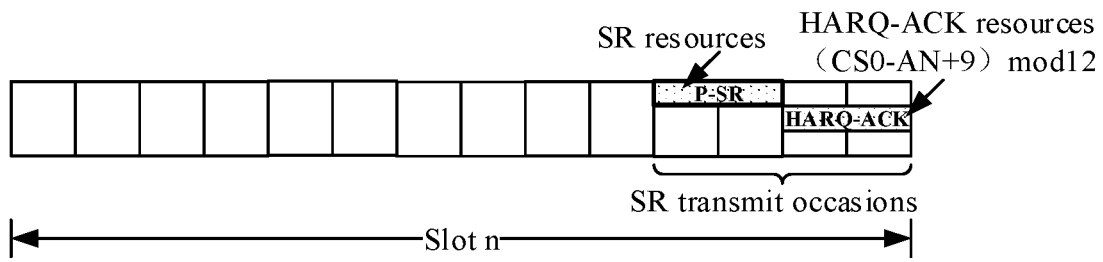
Figure 7:
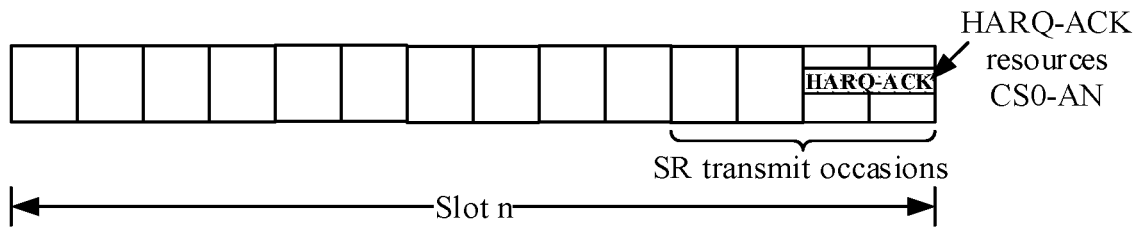

Case 2: as shown in FIG. 4, the transmission time domain resource configured for the HARQ-ACK information are the first and second symbols from last of the slot n, that is, the starting transmission time of the HARQ-ACK information falls behind the starting transmission time of the SR information, that is, the start symbol of the HARQ-ACK information falls behind the start symbol of the SR information, then:

if the UE determines that the P-SR information exists in the current transmit occasion of the SR information, then the 1-bit HARQ-ACK information to be fed back is transmitted on the transmission resource of the HARQ-ACK information using the PUCCH format 0 according to the Table 3, and the cyclic shift value for the actual transmission is determined as (CS0-AN+9) mod 12, which is used to cyclically shift the base sequence to obtain the sequence to be transmitted, then the sequence to be transmitted is mapped onto the RB with number 2 corresponding to the HARQ-ACK information transmission and is transmitted on the first and second symbols from last in the slot n, as shown in FIG. 5;

on the symbols not overlapping with the transmission time domain resource of the HARQ-ACK information, within the transmission time domain resource of the SR information, for example, on the first and second symbols of the SR information: it may be defaulted that the UE can always determine, during subsequent transmission, whether the transmission time domain resource of the HARQ-ACK information overlaps with that of the SR information, so the SR information is not transmitted on the first and second symbols and is directly delayed to the transmission moment of the HARQ-ACK information, and the P-SR information is implicitly expressed by using the transmission resources of the corresponding HARQ-ACK information, as shown in FIG. 5; or, it is also possible to determine whether the SR information is transmitted on the first and second symbols according to whether it can be determined that there is a subsequent overlap of the transmission time domain resources between the HARQ-ACK information and the SR information. If it cannot be determined, then the SR information is transmitted using the PUCCH format 1 on the transmission resources of the SR information in such way that only the positive SR information exists, that is, the cyclic shift value corresponding to each symbol of the transmission time domain resources of the SR information is obtained according to the initial cyclic shift value CS0-SR information of the SR information, and a modulation symbol corresponding to the P-SR information is carried on the sequence obtained after cyclic shifting and time-domain orthogonal spreading, mapped to the RB with number 1 corresponding to the SR information transmission, and transmitted on the third and fourth symbols from last in the slot n. Here the P-SR information is implicitly expressed through the transmission resources of the HARQ-ACK information on the third and fourth symbols, so the SR information does not need to be transmitted on the transmission resources corresponding to the SR information, as shown in FIG. 6. If it can be determined that there is a subsequent overlap of the transmission time domain resources between the HARQ-ACK information and the SR information, the SR information is not transmitted on the first and second symbols and is directly delayed to the transmission moment of the HARQ-ACK information, where the P-SR information is implicitly expressed by using the transmission resources of the corresponding HARQ-ACK information, as shown in FIG. 5;

if the UE determines that there is the N-SR information in the current transmit occasion of the SR information, then the 1-bit HARQ-ACK information to be fed back is transmitted on the transmission resource of the HARQ-ACK information using the PUCCH format 0 according to the Table 1, that is, the Table 1 is looked up according to the feedback state for the 1-bit HARQ-ACK information to obtain the cyclic shift value corresponding to the actual transmission, e.g., the ACK. Then the cyclic shift value for the actual transmission is determined as CS0-AN, which is used to cyclically shift the base sequence to obtain the sequence to be transmitted, and the sequence to be transmitted is mapped onto the RB with number 2 corresponding to the HARQ-ACK information transmission and is transmitted on the last first and second symbols in the slot n, as shown in FIG. 7.

Figure 8:
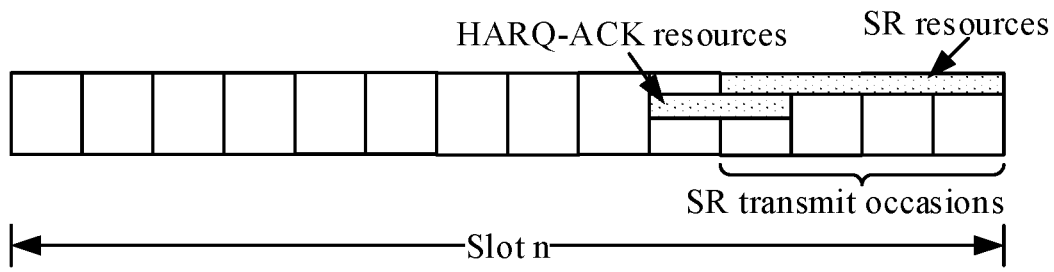
Figure 9:
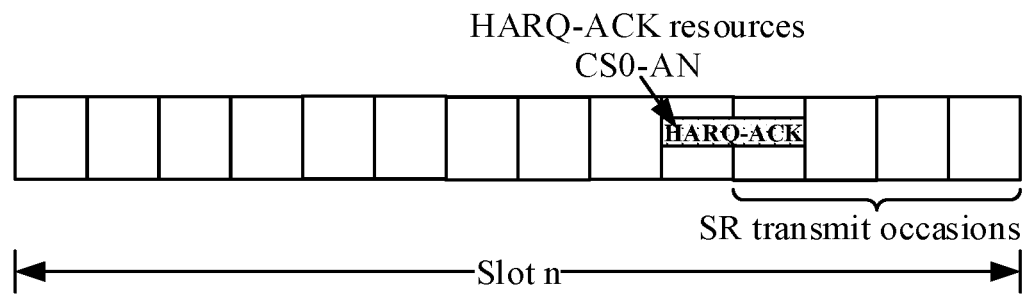
Figure 10:
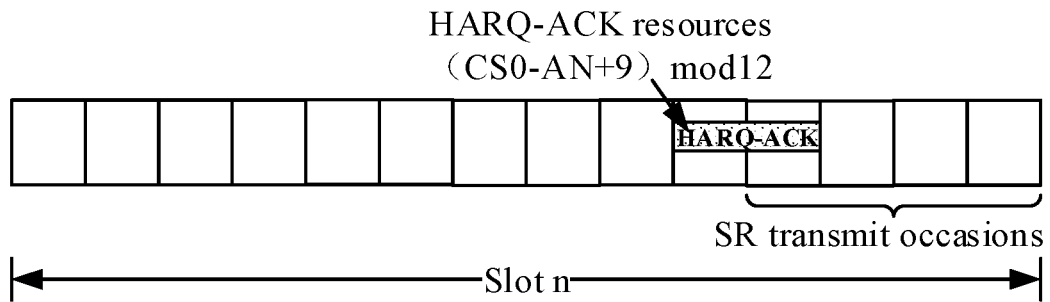

Case 3: as shown in FIG. 8, the transmission time domain resource configured for the HARQ-ACK information are the fourth and fifth symbols from last of the slot n, that is, the starting transmission time of the HARQ-ACK information is ahead of the starting transmission time of the SR information, i.e., the start symbol of the HARQ-ACK information is ahead of the start symbol of the SR information, then:

the SR information is dropped; because the HARQ-ACK information has already been transmitted on the fourth symbol from last and the cyclic shift value used by the transmission of the HARQ-ACK information cannot be changed on the fifth symbol from last according to the P-SR information in the transmission process, therefore it is only possible to drop the SR information. The 1-bit HARQ-ACK information to be fed back is transmitted using the PUCCH format 0 according to the Table 1, that is, the Table 1 is looked up according to the feedback state for the 1-bit HARQ-ACK information to obtain the cyclic shift value corresponding to the actual transmission, e.g., the ACK, and then the cyclic shift value for the actual transmission is determined as CS0-AN, which is used to cyclically shift the base sequence to obtain the sequence to be transmitted, and the sequence to be transmitted is mapped onto the RB with number 2 corresponding to the HARQ-ACK information transmission and is transmitted on the fourth and fifth symbols from last in the slot n, as shown in FIG. 9;

or, if the UE can determine whether the positive SR information exists before the starting transmission time of the HARQ-ACK information: when the P-SR information exists, the 1-bit HARQ-ACK information to be fed back is transmitted using the PUCCH format 0 according to the Table 3, and the cyclic shift value for the actual transmission is determined as (CS0-AN+9) mod 12, which is used to cyclically shift the base sequence to obtain the sequence to be transmitted, and the sequence to be transmitted is mapped onto the RB with number 2 corresponding to the HARQ-ACK information transmission and is transmitted on the fourth and fifth symbols from last in the slot n, as shown in FIG. 10; when the N-SR information exists, no SR is transmitted, as in FIG. 9; otherwise, the UE cannot determine whether the positive SR information exists before the starting transmission time of the HARQ-ACK information, and the SR information is dropped, of which the process is the same as the case of dropping the SR information described above; when N-SR information exists, no SR is transmitted, as in FIG. 9.

Method 2: there is no need to determine the front-to-back relationship between the starting transmission time of the HARQ-ACK information and the starting transmission time of the SR information (i.e., regardless of the above case 1, 2 or 3), and the cyclic shift set for the transmission of the HARQ-ACK information is directly selected according to the state of the SR information. That is, it is assumed that the UE can determine whether the P-SR information exists in the transmit occasion of the SR information before the start symbol of the HARQ-ACK information. For the case 1 and the case 2, this is obvious. For the case 3, since the HARQ-ACK information is ahead of the start symbol of the transmit occasion of the SR information by only one symbol, while there is a need to determine whether the P-SR information exists in the transmit occasion of the SR information before the transmit occasion of the SR information due to the time to prepare the channel for transmitting the SR information, thus this assumption may be established.

If the UE determines that the SR needs to be transmitted in the current transmit occasion of the SR information (that is, the P-SR information exists), then the 1-bit HARQ-ACK information to be fed back is transmitted using the PUCCH format 0 according to the Table 3, and the cyclic shift value for the actual transmission is determined as (CS0-AN+9) mod 12, which is used to cyclically shift the base sequence to obtain the sequence to be transmitted, and the sequence to be transmitted is mapped onto the RB with number 2 corresponding to the HARQ-ACK information transmission and is transmitted on the symbols of the transmission time domain resource corresponding to the HARQ-ACK information in the slot n, as shown in FIGS. 2, 5, 6 and 10.

If the UE determines that there is no need to transmit the SR (i.e., it is the N-SR information) in the current transmit occasion of the SR information, then the 1-bit HARQ-ACK information to be fed back is transmitted using the PUCCH format 0 according to the Table 1. That is, the Table 1 is looked up according to the feedback state for the 1-bit HARQ-ACK information to obtain the cyclic shift value corresponding to the actual transmission, e.g., the ACK, and then the cyclic shift value for the actual transmission is determined as CS0-AN, which is used to cyclically shift the base sequence to obtain the sequence to be transmitted, and the sequence to be transmitted is mapped onto the RB with number 2 corresponding to the HARQ-ACK information transmission and is transmitted on the symbols of the transmission time domain resource corresponding to the HARQ-ACK information in the slot n, as shown in FIGS. 3, 7 and 9.

For the above process, when the base station performs the detection, since it is not determined whether P-SR information transmission for UE exists in the transmission opportdeviceies of the SR information, the format 1 scheme needs to be used for the transmission resource of the SR information, and the format 0 scheme is used for blind detection since there are two cyclic shift sets on the transmission resource of the HARQ-ACK information. If the base station has sent the downlink transmission that needs HARQ-ACK information feedback to be performed at the time domain position overlapping with the transmit occasion of the SR information, the base station (gNB) determines that the P-SR information exists and that the UE loses the downlink transmission and needs to retransmit the downlink transmission if no feedback information is received on the transmission resource of the HARQ-ACK information while the feedback information is received on the transmission resource of the SR information. If the HARQ-ACK information is detected through the first cyclic shift set on the transmission resource (here, RB positions and time domain positions) of the HARQ-ACK information, it is determined that the N-SR information exists; and if the HARQ-ACK information is detected through the second cyclic shift set on the transmission resource (here, RB positions and time domain positions) of the HARQ-ACK information, it is determined that the P-SR information also exists. If the base station does not send the downlink transmission that needs HARQ-ACK information feedback to be performed at the time domain position overlapping with the transmit occasion of the SR information, there is only a need to detect on the transmission resource of the SR information. If the information is detected, the P-SR information exists; and if it is Discontinuous Transmission (DTX), the N-SR information exists.

It should be noted that, in the above embodiments, the HARQ-ACK information of 1 bit is only taken as an example. If it is of 2 bits, the Table 2 or Table 4 is used, and the process is similar and will not be repeated.

The above process only takes the SR information configured with the PUCCH format 1 as an example. If the SR information is configured with the PUCCH format 0, the process is similar. The only difference is that the SR information (if transmitted) is transmitted using the format 0 on the transmission time domain resource of the SR information, and the combined transmission of the HARQ-ACK information and the P-SR information is the same as above and will not be repeated.

The above process is also applicable if the HARQ-ACK is configured with the PUCCH format 1 and the SR is configured with the PUCCH format 0, and the difference is that the PUCCH formats of the HARQ-ACK and the SR are exchanged, different PUCCH format 1 resources (for example, different resources have different RB positions and/or CS values and/or OCC sequences, etc.) are selected for transmission according to whether the positive SR exists when the HARQ-ACK is transmitted, and the HARQ-ACK is transmitted by using the PUCCH format 1, to implicitly express whether the positive SR exists through different transmission resources. The specific situation is similar to the above embodiment and will not be repeated. In the part of the SR not overlapping with the HARQ-ACK, the transmission may be performed using the format 0 configured for the SR itself or the SR may be dropped. The specific situation is similar to the above embodiment and will not be repeated.

Figure 11:
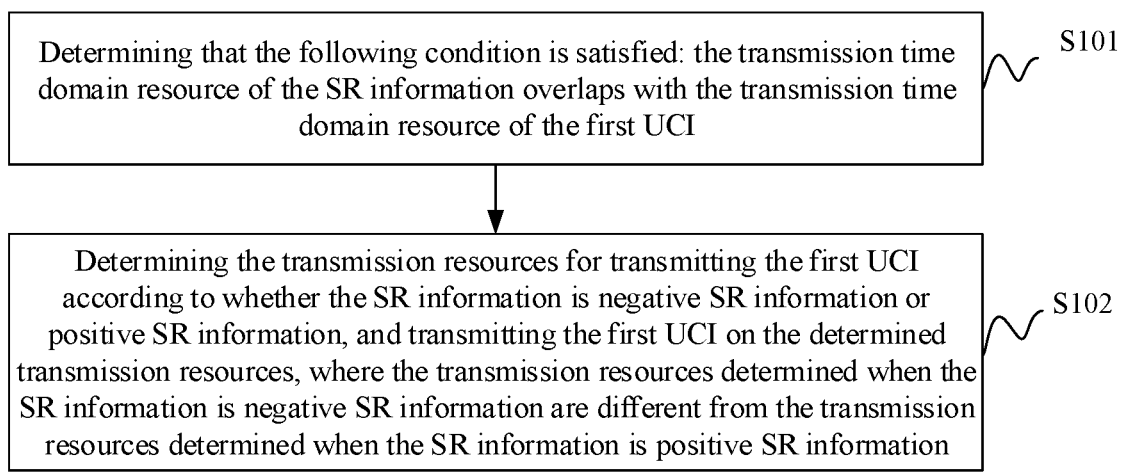
FIG. 11 is a flow schematic diagram of a method for transmitting the UCI provided by an embodiment of the present application.

In summary, referring to FIG. 11, a method for transmitting UCI provided by an embodiment of the present application includes:

S101: determining that the following condition is satisfied: the transmission time domain resource of the SR information overlaps with the transmission time domain resource of the first UCI;

S102: determining the transmission resource for transmitting the first UCI according to whether the SR information is negative SR information or positive SR information (i.e., according to the type of the SR information), and transmitting the first UCI on the determined transmission resources.

Here the transmission resource determined when the SR information is negative SR information is different from the transmission resource determined when the SR information is positive SR information. Here, the different transmission resources at least include different frequency domain resources and/or code domain resources, e.g., different PRB positions, different OCC sequences, different cyclic shifts, etc.

This method provided by the embodiment of the present application may be applicable to the UE side or the network side, e.g., base station side. At the UE side, the method for transmitting UCI is a method for sending UCI, and correspondingly, at the network side, the method for transmitting UCI is a method for receiving UCI.

The embodiment of the present application ensures that the network side can obtain various types of UCI (e.g., the SR information and HARQ-ACK feedback information and/or periodic CSI) in time through the above-mentioned method. Specifically, for example, when the HARQ-ACK information and the SR information are configured with different NR PUCCH formats or configured with the same format but unaligned transmission moments, and when the transmission time domain resources of the periodic CSI and the SR information overlap, the SR information and HARQ-ACK information and/or periodic CSI can be transmitted simultaneously, thereby ensuring that the network side can obtain the SR information and HARQ-ACK feedback information and/or periodic CSI in time.

The feedback information may be acknowledgement (ACK) information or non-acknowledgement (NACK) information, i.e., the HARQ-ACK described above.

In one embodiment, the condition further includes: the first UCI is configured to be transmitted using a first channel format, and the SR information is configured to be transmitted using a second channel format, or the SR information is configured to be transmitted using the first channel format and the transmission time of the SR information partially overlap with the transmission time of the first UCI.

In one embodiment, determining the transmission resource for transmitting the first UCI according to whether the SR information is negative SR information or positive SR information, and transmitting the first UCI on the determined transmission resource, includes:

when the SR information is negative SR information, transmitting the first UCI using the first channel format on the transmission resource of the first UCI according to a first cyclic shift set;

when the SR information is positive SR information, transmitting the first UCI using the first channel format on the transmission resource of the first UCI according to a second cyclic shift set;

where the first cyclic shift set is different from the second cyclic shift set.

In one embodiment, the first cyclic shift set and the second cyclic shift set each is obtained according to the initial cyclic shift configured for the first UCI and a predetermined offset.

In one embodiment, the condition further includes: the first UCI is configured to be transmitted using a third channel format.

In one embodiment, determining the transmission resource for transmitting the first UCI according to whether the SR information is negative SR information or positive SR information, and transmitting the first UCI on the determined transmission resource, includes:

when the SR information is negative SR information, transmitting the first UCI using the third channel format on first transmission resource;

when the SR information is positive SR information, transmitting the first UCI using the third channel format on second transmission resource;

where the first transmission resource is different from the second transmission resource.

In one embodiment, the condition further includes: the starting transmission times of the first UCI and the SR information are same; and/or the starting transmission time of the first UCI falls behind the starting transmission time of the SR information.

In one embodiment, the method further includes: if the starting transmission time of the first UCI is ahead of the starting transmission time of the SR information, then:

discarding the SR information; or, determining a UCI transmission scheme according to whether the SR information is positive SR information or not could be determined before the starting transmission time of the first UCI.

In one embodiment, determining a UCI transmission scheme according to whether the SR information is positive SR information or not could be determined before the starting transmission time of the first UCI, includes:

performing a step after determining that the condition is satisfied, in response to that the SR information is positive SR information or not could be determined before the starting transmission time of the first UCI;

discarding the SR information, in response to that the SR information is positive SR information or not could not be determined before the starting transmission time of the first UCI.

In one embodiment, when the SR information is positive SR information, transmitting the first UCI in the first channel format on the transmission resource of the first UCI according to a second cyclic shift set, includes:

when the SR information is positive SR information, performing a step after determining that the condition is satisfied on symbols overlapping with the transmission time domain resource of the SR information, within the transmission time domain resource of the first UCI.

In one embodiment, the method further includes:

transmitting the first UCI using the first channel format according to the first cyclic shift set on symbols not overlapping with the transmission time domain resource of the SR information, within the transmission time domain resource of the first UCI.

In one embodiment, the method further includes: on symbols not overlapping with the first UCI among symbols of the transmission time domain resource of the SR information, or on symbols not overlapping with the transmission time domain resources of the first UCI within in the transmission time domain resource of the SR information, when the starting transmission time of the first UCI falls behind the starting transmission time of the SR information, performing the following steps:

when the SR information is positive SR information, transmitting the positive SR information on transmission resource corresponding to the SR information using a PUCCH format configured for the SR information;

or, determining not to transmit the SR information;

or, if it is determined that the first UCI exists in the transmission time domain resources of the SR information before the starting transmission time of the SR information, determining not to transmit the SR information; otherwise, if the SR information is positive SR information, transmitting the positive SR information on transmission resource corresponding to the SR information using a PUCCH format configured for the SR information.

In one embodiment, the first channel format is the New Radio (NR) Physical Uplink Control Channel (PUCCH) format 0; and/or the second channel format is the New Radio (NR) Physical Uplink Control Channel (PUCCH) format 1.

In one embodiment, the third channel format is the NR PUCCH format 1 or format 2 or format 3 or format 4.

In one embodiment, the first UCI is Hybrid Automatic Repeat reQuest feedback information (HARQ-ACK) and/or periodic Channel State Information (CSI).

Figure 12:
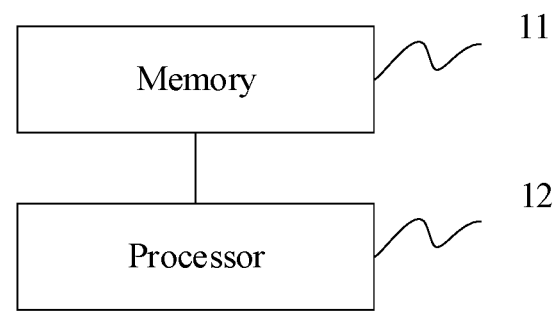
FIG. 12 is a structural schematic diagram of an apparatus for transmitting the UCI provided by an embodiment of the present application.

Referring to FIG. 12, an apparatus for transmitting UCI provided by an embodiment of the present application includes:

a memory 11 configured to store program instructions;

a processor 12 configured to invoke the program instructions stored in the memory, and in accordance with the obtained program, perform the process of:

determining that the following condition is satisfied: the transmission time domain resource of the SR information overlaps with the transmission time domain resource of the first UCI;

determining the transmission resource for transmitting the first UCI according to whether the SR information is negative SR information or positive SR information, and transmitting the first UCI on the determined transmission resource, where the transmission resource determined when the SR information is negative SR information are different from the transmission resource determined when the SR information is positive SR information.

In one embodiment, the condition further includes: the first UCI is configured to be transmitted using a first channel format, and the SR information is configured to be transmitted using a second channel format, or the SR information is configured to be transmitted using the first channel format and the transmission time of the SR information partially overlap with the transmission time of the first UCI.

In one embodiment, determining the transmission resource for transmitting the first UCI according to whether the SR information is negative SR information or positive SR information, and transmitting the first UCI on the determined transmission resources, includes:

when the SR information is negative SR information, transmitting the first UCI using the first channel format on the transmission resource of the first UCI according to a first cyclic shift set;

when the SR information is positive SR information, transmitting the first UCI using the first channel format on the transmission resource of the first UCI according to a second cyclic shift set;

where the first cyclic shift set is different from the second cyclic shift set.

In one embodiment, the first cyclic shift set and the second cyclic shift set each is obtained according to the initial cyclic shift configured for the first UCI and a predetermined offset.

In one embodiment, the condition further includes: the first UCI is configured to be transmitted using a third channel format.

In one embodiment, determining the transmission resource for transmitting the first UCI according to whether the SR information is negative SR information or positive SR information, and transmitting the first UCI on the determined transmission resource, includes:

when the SR information is negative SR information, transmitting the first UCI using the third channel format on first transmission resource;

when the SR information is positive SR information, transmitting the first UCI using the third channel format on second transmission resource;

where the first transmission resource is different from the second transmission resource.

In one embodiment, the condition further includes: the starting transmission times of the first UCI and the SR information are same; and/or the starting transmission time of the first UCI falls behind the starting transmission time of the SR information.

In one embodiment, the processor is further configured to: if the starting transmission time of the first UCI is ahead of the starting transmission time of the SR information, then:

discard the SR information; or, determine a UCI transmission scheme according to whether the SR information is positive SR information or not could be determined before the starting transmission time of the first UCI.

In one embodiment, determining a UCI transmission scheme according to whether the SR information is positive SR information or not could be determined before the starting transmission time of the first UCI, includes:

in response to that the SR information is positive SR information or not could be determined before the starting transmission time of the first UCI, performing a step after determining that the condition is satisfied;

in response to that the SR information is positive SR information or not could not be determined before the starting transmission time of the first UCI, discarding the SR information.

In one embodiment, when the SR information is positive SR information, transmitting the first UCI using the first channel format on the transmission resource of the first UCI according to a second cyclic shift set, includes:

when the SR information is positive SR information, performing a step after determining that the condition is satisfied on symbols in the transmission time domain resource of the first UCI overlapping with the transmission time domain resource of the SR information.

In one embodiment, the processor is further configured to:

transmit the first UCI using the first channel format according to the first cyclic shift set on symbols not overlapping with the transmission time domain resource of the SR information, within the transmission time domain resource of the first UCI.

In one embodiment, the processor is further configured to:

on symbols not overlapping with the first UCI among symbols of the transmission time domain resource of the SR information, or on symbols not overlapping with the transmission time domain resource of the first UCI within the transmission time domain resource of the SR information when the starting transmission time of the first UCI falls behind the starting transmission time of the SR information, perform the following steps:

when the SR information is positive SR information, transmitting the positive SR information on transmission resource corresponding to the SR information using a PUCCH format configured for the SR information;

or, determining not to transmit the SR information;

or, if it is determined that the first UCI exists in the transmission time domain resource of the SR information before the starting transmission time of the SR information, determining not to transmit the SR information; otherwise, if the SR information is positive SR information, transmitting the positive SR information on transmission resources corresponding to the SR information using a PUCCH format configured for the SR information.

In one embodiment, the first channel format is the New Radio (NR) Physical Uplink Control Channel (PUCCH) format 0; and/or the second channel format is the New Radio (NR) Physical Uplink Control Channel (PUCCH) format 1.

In one embodiment, the third channel format is the New Radio (NR) Physical Uplink Control Channel (PUCCH) format 1 or 2 or 3 or 4.

In one embodiment, the first UCI is Hybrid Automatic Repeat reQuest feedback information (HARQ-ACK) and/or periodic Channel State Information (CSI).

Figure 13:
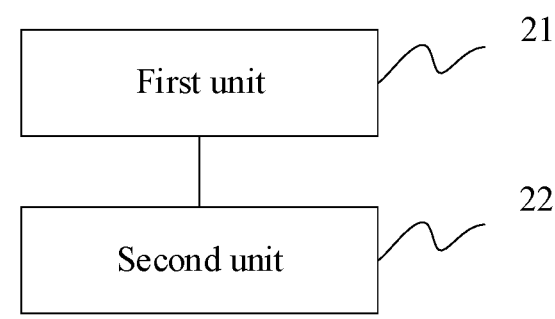
FIG. 13 is a structural schematic diagram of another apparatus for transmitting the UCI provided by an embodiment of the present application.

Referring to FIG. 13, another apparatus for transmitting UCI provided by an embodiment of the present application includes:

a first device 21 configured to determine that the following condition is satisfied: the transmission time domain resource of the SR information overlaps with the transmission time domain resource of the first UCI;

a second device 22 configured to determine the transmission resource for transmitting the first UCI according to whether the SR information is negative SR information or positive SR information, and transmit the first UCI on the determined transmission resource, where the transmission resource determined when the SR information is negative SR information is different from the transmission resource determined when the SR information is positive SR information.

The apparatus for transmitting the UCI provided by the embodiments of the present application may be a terminal-side device, e.g., a UE, or may be a network-side device, e.g., a base station.

An embodiment of the present application provides a computer storage medium for storing the computer program instructions used by the above apparatus, where the computer storage medium contains the program for performing any one of the methods provided by the embodiments of the present application described above.

The computer storage medium can be any available media or data storage device accessible to the computer, including but not limited to magnetic memory (e.g., floppy disk, hard disk, magnetic tape, Magnetic Optical disc (MO) or the like), optical memory (e.g., CD, DVD, BD, HVD or the like), semiconductor memory (e.g., ROM, EPROM, EEPROM, nonvolatile memory (NAND FLASH), Solid State Disk (SSD)) or the like.

The methods provided by the embodiments of the present application can be applied to the terminal devices, and can also be applied to the network devices.

Here, the terminal device can also referred to as the User Equipment ("UE" for short), Mobile Station ("MS" for short), Mobile Terminal ("MT" for short) or the like. In one embodiment, the terminal can has the ability of communicating with one or more core networks via the Radio Access Network (RAN). For example, the terminal can be a mobile telephone (or called "cellular" telephone), or a computer with the mobile property. For example, the terminal can also be a portable, pocket, handheld, computer built-in or vehicle-carried mobile device.

The network device can be a base station (e.g., access point), which means the device in the access network communicating with the wireless terminal via one or more sectors over the air interface. The base station may be used to perform the interconversion between the received air frame and the IP packet, and used as the router between the wireless terminal and the rest of the access network, and the rest of the access network may include Internet Protocol (IP) networks. The base station may further coordinate the attribute management of the air interface. For example, the base station may be the Base Transceiver Station (BTS) in the GSM or CDMA, or may be the NodeB in the WCDMA, or may be the evolutional Node B (NodeB or eNB or e-NodeB) in the LTE, which is not limited in the embodiments of the disclosure.

In summary, in the embodiments of the present application, when the HARQ-ACK information is configured with the format 0 and the SR information is configured with the format 1, or the SR information is configured with the format 0 and the transmission time thereof is partially the same as the transmission time of the HARQ-ACK information, the HARQ-ACK information is transmitted by using different HARQ-ACK information cyclic shift sets to implicitly express the state of the SR information. That is, the embodiments of the present application give the UCI transmission method. When the HARQ-ACK information is configured to use the NR PUCCH format 0 and the SR information is configured to use the NR PUCCH format 1, or the SR information is configured to use the NR PUCCH format 0 and the transmission time thereof partially overlaps with the transmission time of the HARQ-ACK information, the HARQ-ACK information is transmitted by using different HARQ-ACK information cyclic shift sets to implicitly express the state of the SR information, thereby realizing the simultaneous transmission of the HARQ-ACK information and the positive SR information and ensuring that the base station can obtain the SR information and the HARQ-ACK information in time.

It should be understood by those skilled in the art that the embodiments of the disclosure can provide methods, systems and computer program products. Thus the disclosure can take the form of hardware embodiments alone, software embodiments alone, or embodiments combining the software and hardware aspects. Also the disclosure can take the form of computer program products implemented on one or more computer usable storage mediums (including but not limited to magnetic disk memories, CD-ROMs, optical memories and the like) containing computer usable program codes therein.

The disclosure is described by reference to the flow charts and/or the block diagrams of the methods, the devices (systems) and the computer program products according to the embodiments of the disclosure. It should be understood that each process and/or block in the flow charts and/or the block diagrams, and a combination of processes and/or blocks in the flow charts and/or the block diagrams can be implemented by the computer program instructions. These computer program instructions can be provided to a general-purpose computer, a dedicated computer, an embedded processor, or a processor of another programmable data processing device to produce a machine, so that an apparatus for implementing the functions specified in one or more processes of the flow charts and/or one or more blocks of the block diagrams is produced by the instructions executed by the computer or the processor of another programmable data processing device.

These computer program instructions can also be stored in a computer readable memory guides the computer or another programmable data processing device to operate in a particular way, so that the instructions stored in the computer readable memory produce a manufacture including the instruction apparatus which implements the functions specified in one or more processes of the flow charts and/or one or more blocks of the block diagrams.

These computer program instructions can also be loaded onto the computer or another programmable data processing device, so that a series of operation steps are performed on the computer or another programmable device to produce the computer-implemented processing. Thus the instructions executed on the computer or another programmable device provide steps for implementing the functions specified in one or more processes of the flow charts and/or one or more blocks of the block diagrams.

Although the preferred embodiments of the invention have been described, those skilled in the art can make additional alterations and modifications to these embodiments once they learn about the basic creative concepts. Thus the attached claims are intended to be interpreted to include the preferred embodiments as well as all the alterations and modifications falling within the scope of the invention.

Evidently those skilled in the art can make various modifications and variations to the embodiments of the invention without departing from the spirit and scope of the embodiments of the invention. Thus the invention is also intended to encompass these modifications and variations therein as long as these modifications and variations to the embodiments of the invention come into the scope of the claims of the invention and their equivalents.

What is claimed is:

1. A method for communicating Uplink Control Information, UCI, comprising:
   determining that a following condition is satisfied: a transmission time domain resource of Scheduling Request, SR, information overlaps with a transmission time domain resource of first UCI;
   determining a transmission resource for communicating the first UCI according to whether the SR information is negative SR information or positive SR information, and communicating the first UCI on the determined transmission resource;
   wherein, the condition comprises at least one of following:
   condition 1:
   the first UCI is configured to be communicated using a first channel format and
   the SR information is configured to be communicated using a second channel format, or the SR information is configured to be communicated using the first channel format and transmission time of the SR information partially overlap with transmission time of the first UCI;
   or
   condition 2:
   the first UCI is configured to be communicated using a third channel format
   wherein
   for condition 1, said determining the transmission resource for communicating the first UCI according to whether the SR information is negative SR information or positive SR information, and communicating the first UCI on the determined transmission resource, comprises:
   when the SR information is negative SR information, communicating the first UCI using the first channel format on the transmission resource of the first UCI according to a first cyclic shift set;
   when the SR information is positive SR information, communicating the first UCI using the first channel format on the transmission resource of the first UCI according to a second cyclic shift set;
   wherein the first cyclic shift set is different from the second cyclic shift set, and the first cyclic shift set and the second cyclic shift set each is obtained according to an initial cyclic shift configured for the first UCI and a predetermined offset;
   for condition 2, said determining the transmission resource for communicating the first UCI according to whether the SR information is negative SR information or positive SR information, and communicating the first UCI on the determined transmission resource, comprises:
   when the SR information is negative SR information, communicating the first UCI using the third channel format on first transmission resource;
   when the SR information is positive SR information, communicating the first UCI using the third channel format on second transmission resource;
   wherein both the first transmission resource and the second transmission resource are resources of the first UCI, and the first transmission resource is different from the second transmission resource.

2. The method according to claim 1, wherein, at least one of following schemes are comprised:
   scheme 1: the condition further comprises: a starting transmission time of the first UCI is same as a starting time of the SR information; and/or the starting transmission time of the first UCI falls behind the starting transmission time of the SR information;
   or
   scheme 2: the method further comprises: if a starting transmission time of the first UCI is ahead of a starting transmission time of the SR information, then:
   discarding the SR information; or, determining a UCI transmission scheme according to whether the SR information is positive SR information or not is able to be determined before the starting transmission time of the first UCI.

3. The method according to claim 2, wherein, if the starting transmission time of the first UCI is ahead of the starting transmission time of the SR information, said that determining a UCI transmission scheme according to whether the SR information is positive SR information or not is able to be determined before the starting transmission time of the first UCI, comprises:
   in response to that the SR information is positive SR information or not is able to be determined before the starting transmission time of the first UCI, determining transmission resources for communicating the first UCI according to whether the SR information is negative SR information or positive SR information, and communicating the first UCI on the determined transmission resources; wherein transmission resources determined when the SR information is negative SR information are different from transmission resources determined when the SR information is positive SR information;
   in response to that the SR information is positive SR information or not is not able to be determined before the starting transmission time of the first UCI, discarding the SR information.

4. The method according to claim 1, wherein, said that when the SR information is positive SR information, communicating the first UCI in the first channel format on the transmission resource of the first UCI according to a second cyclic shift set, specifically comprises:
   performing a step after determining that the condition is satisfied on symbols overlapping with the transmission time domain resource of the SR information, within the transmission time domain resource of the first UCI.

5. The method according to claim 4, wherein, the method further comprises:

communicating the first UCI in the first channel format according to the first cyclic shift set on symbols not overlapping with the transmission time domain resource of the SR information, within the transmission time domain resource of the first UCI.

6. The method according to claim 1, wherein, the method further comprises: on symbols not overlapping with the first UCI among symbols of the transmission time domain resource of the SR information, or on symbols not overlapping with the transmission time domain resource of the first UCI within the transmission time domain resource of the SR information when a starting transmission time of the first UCI falls behind a starting transmission time of the SR information, performing following steps:

when the SR information is positive SR information, communicating the positive SR information on transmission resource corresponding to the SR information using a PUCCH format configured for the SR information;

or, determining not to communicate the SR information;

or, if it is determined that the first UCI exists in the transmission time domain resource of the SR information before the starting transmission time of the SR information, determining not to communicate the SR information; otherwise, if the SR information is positive SR information, communicating the positive SR information on transmission resource corresponding to the SR information using a PUCCH format configured for the SR information.

7. The method according to claim 1, wherein, the first channel format is a New Radio, NR, Physical Uplink Control Channel, PUCCH, format 0; the second channel format is a New Radio, NR, Physical Uplink Control Channel, PUCCH, format 1; the third channel format is a New Radio, NR, Physical Uplink Control Channel, PUCCH, format 1 or 2 or 3 or 4.

8. An apparatus for communicating Uplink Control Information, UCI, comprising:

a memory configured to store program instructions;

a processor configured to invoke the program instructions stored in the memory, and in accordance with the stored program instructions, perform a process of:

determining that a following condition is satisfied: a transmission time domain resource of Scheduling Request, SR, information overlaps with a transmission time domain resource of first UCI;

determining a transmission resource for communicating the first UCI according to whether the SR information is negative SR information or positive SR information, and communicating the first UCI on the determined transmission resource the condition comprises at least one of following:

condition 1:

the first UCI is configured to be communicated using a first channel format and the SR information is configured to be communicated using a second channel format, or the SR information is configured to be communicated using the first channel format and transmission time of the SR information partially overlap with transmission time of the first UCI;

or condition 2:

the first UCI is configured to be communicated using a third channel format wherein for condition 1, said determining the transmission resource for communicating the first UCI according to whether the SR information is negative SR information or positive SR information, and communicating the first UCI on the determined transmission resource, comprises:

when the SR information is negative SR information, communicating the first UCI using the first channel format on the transmission resource of the first UCI according to a first cyclic shift set;

when the SR information is positive SR information, communicating the first UCI using the first channel format on the transmission resource of the first UCI according to a second cyclic shift set;

wherein the first cyclic shift set is different from the second cyclic shift set, and the first cyclic shift set and the second cyclic shift set each is obtained according to an initial cyclic shift configured for the first UCI and a predetermined offset;

for condition 2, said determining the transmission resource for communicating the first UCI according to whether the SR information is negative SR information or positive SR information, and communicating the first UCI on the determined transmission resource, comprises:

when the SR information is negative SR information, communicating the first UCI using the third channel format on first transmission resource;

when the SR information is positive SR information, communicating the first UCI using the third channel format on second transmission resource;

wherein both the first transmission resource and the second transmission resource are resources of the first UCI, and the first transmission resource is different from the second transmission resource.

9. The apparatus according to claim 8, wherein, at least one of following schemes are comprised:

scheme 1: the condition further comprises at least one of: starting transmission times of the first UCI and the SR information are same; or a starting transmission time of the first UCI falls behind the starting transmission time of the SR information;

or scheme 2: the processor is further configured to: if a starting transmission time of the first UCI is ahead of a starting transmission time of the SR information, then:

discard the SR information; or, determine a UCI transmission scheme according to whether the SR information is positive SR information or not is able to be determined before the starting transmission time of the first UCI.

10. The apparatus according to claim 9, wherein, if the starting transmission time of the first UCI is ahead of the starting transmission time of the SR information, said that determining a UCI transmission scheme according to whether the SR information is positive SR information or not is able to be determined before the starting transmission time of the first UCI, comprises:

in response to that the SR information is positive SR information or not is able to be determined before the starting transmission time of the first UCI, determining a transmission resource for communicating the first UCI according to whether the SR information is negative SR information or positive SR information, and communicating the first UCI on the determined transmission resource; wherein the transmission resource determined when the SR information is negative SR information is different from the transmission resource determined when the SR information is positive SR information;

in response to that the SR information is positive SR information or not is not able to be determined before the starting transmission time of the first UCI, discarding the SR information.

11. The apparatus according to claim 8, wherein, said that when the SR information is positive SR information, communicating the first UCI in the first channel format on the transmission resource of the first UCI according to a second cyclic shift set, specifically comprises:

performing a step after determining that the condition is satisfied on symbols in the transmission time domain resource of the first UCI overlapping with the transmission time domain resource of the SR information.

12. The apparatus according to claim 11, wherein, the processor is further configured to:

communicate the first UCI using the first channel format according to the first cyclic shift set on symbols in the transmission time domain resource of the first UCI not overlapping with the transmission time domain resource of the SR information.

13. The apparatus according to claim 8, wherein, the processor is further configured to: on symbols not overlapping with the first UCI among symbols of the transmission time domain resource of the SR information, or on symbols not overlapping with the transmission time domain resource of the first UCI within the transmission time domain resource of the SR information when a starting transmission time of the first UCI falls behind a starting transmission time of the SR information, perform following steps:

when the SR information is positive SR information, communicating the positive SR information on transmission resource corresponding to the SR information using a PUCCH format configured for the SR information;

or, determining not to communicate the SR information;

or, if it is determined that the first UCI exists in the transmission time domain resource of the SR information before the starting transmission time of the SR information, determining not to communicate the SR information; otherwise, if the SR information is positive SR information, communicating the positive SR information on transmission resource corresponding to the SR information using a PUCCH format configured for the SR information.

14. The apparatus according to claim 8, wherein, the first channel format is a New Radio, NR, Physical Uplink Control Channel, PUCCH, format 0; the second channel format is a New Radio, NR, Physical Uplink Control Channel, PUCCH, format 1; the third channel format is a New Radio, NR, Physical Uplink Control Channel, PUCCH, format 1 or 2 or 3 or 4.

* * * * *